US008605261B2

United States Patent
Rindle

(10) Patent No.: US 8,605,261 B2
(45) Date of Patent: Dec. 10, 2013

(54) DEVICE AND METHOD FOR THE DETERMINATION OF DISTANCE BY MEANS OF LIGHT PULSES

(75) Inventor: Peter Rindle, Ochsenhausen (DE)

(73) Assignee: Trimble Germany GmbH, Frankfurt am Main (DE)

( * ) Notice: Subject to any disclaimer, the term of this patent is extended or adjusted under 35 U.S.C. 154(b) by 0 days.

(21) Appl. No.: 13/492,996

(22) Filed: Jun. 11, 2012

(65) Prior Publication Data

US 2012/0281200 A1 Nov. 8, 2012

Related U.S. Application Data

(63) Continuation of application No. 12/449,290, filed on Sep. 2, 2009, now Pat. No. 8,212,998.

(30) Foreign Application Priority Data

Mar. 2, 2007 (DE) .......................... 10 2007 010 236

(51) Int. Cl.
*G01C 3/08* (2006.01)
(52) U.S. Cl.
USPC ......... 356/5.03; 356/3.01; 356/3.1; 356/4.01; 356/4.1; 356/5.01
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 4,926,185 | A | 5/1990 | Wittenberg |
| 6,734,849 | B2 | 5/2004 | Dimsdale et al. |
| 6,926,227 | B1 | 8/2005 | Young et al. |
| 2003/0066977 | A1* | 4/2003 | Hipp et al. ............... 250/559.38 |
| 2004/0135992 | A1 | 7/2004 | Munro |

FOREIGN PATENT DOCUMENTS

| DE | 36 06 544 C1 | 10/1987 |
| DE | 198 06 741 A1 | 8/1999 |
| DE | 10 2007 010 236 B4 | 11/2008 |
| EP | 1 288 676 A | 3/2003 |
| EP | 1 832 897 A1 | 9/2007 |

(Continued)

OTHER PUBLICATIONS

Appeal Brief dated May 22, 2012 from decision in opposition to grant of patent in counterpart German patent application 10 2007 010 236.6-55.

(Continued)

*Primary Examiner* — Luke Ratcliffe
(74) *Attorney, Agent, or Firm* — Bruce D Riter

(57) ABSTRACT

Methods and devices for the determination of distance by means of light pulses are disclosed. A light source emits light pulses with specified frequency. A detector receives reflected light pulses. A controller controls the light source and detector by means of signals. At least two timers are connected to the controller and the detector. When a light pulse is emitted by the light source, the controller generates a start signal triggering a time measurement by each of the at least two timers, in order, and beginning again from the start. Upon receiving a reflected light pulse, the detector generates a stop signal which stops the time measurement by the timer of the at least two timers, to which at that instant a measuring window is assigned by the controller. The device can be designed as a fiber-optic scanner.

12 Claims, 3 Drawing Sheets

(56) References Cited

FOREIGN PATENT DOCUMENTS

| EP | 832 897 A1 | 9/2007 |
|---|---|---|
| WO | 03 016944 A2 | 2/2003 |
| WO | 2006 123084 A1 | 11/2006 |

OTHER PUBLICATIONS

Reply dated 2012 to appeal from decision in opposition to grant of patent in counterpart German patent application 10 2007 010 236.6-55.
Einspruch gegen das deutsche Patent DE 10 2007 010 236, dated Feb. 19, 2009, 13 pp. (with English-language translation 12 pp.).
In Erwiderung auf den Bescheid vom 20. Maerz 2009, eingegangen am 27. Maerz 2009, dated Oct. 9, 2009, 27 pp. (with English-language translation 13 pp.).
In Erwiderung auf die Stellungnahme der Patentinhaberin vom Sep. 10, 2009, dated Feb. 11, 2010, 8 pp. (with English-language translation 8 pp.).
Niederschrift ueber die Anhoerung, dated Mar. 3, 2010, 3 pp. (with English-language translation 2 pp.).
In Erwiderung auf die in der Anhoerung vom 3. Maerz eingefuehrten Hilfsantraege, dated Mar. 5, 2010, 5 pp. (with English-language translation 4 pp.).
Auf die Mitteilung der Niederschrift ueber die Anhoerung vom 03. Maerz 2010, dated Apr. 7, 2010, 5 pp. (with English-language translation 3 pp.).
German Patent & Trademark Office Decision in the Opposition to Patent 10 2007 010 236, dated May 20, 2010, 12 pp. (with English-language translation 12 pp.).
Auf die amtliche Mitteilung vom 20. Mai 2010, eingegangen am 18. Juni 2010, dated Jun. 30, 2010, 3 pp. (with English-language translation 2 pp.).
German Patent & Trademark Office Decision in the Opposition to Patent 10 2007 010 236, dated Dec. 1, 2010, 18 pp. (with English-language translation, 14 pp.).
K. Schnadt et al., "Unique airborne fiber scanner technique for application-oriented lidar products," Oct. 3, 2004, International Archives of Photogrammetry, Remote Sensing and Spatial Information Sciences, Freiburg, Germany XP007904856, pp. 19-23.
International Search Report in International Application No. PCT/EP2008/001628, 6 pp.

* cited by examiner

DEVICE AND METHOD FOR THE DETERMINATION OF DISTANCE BY MEANS OF LIGHT PULSES

RELATED APPLICATIONS

This application claims benefit of German application for patent DE 10 2007 010 236.6 filed 2 Mar. 2007, the content of which is incorporated herein by this reference, and of International application for patent PCT/EP2008/001628 filed 29 Feb. 2008, the content of which is incorporated herein by this reference, and of U.S. patent application Ser. No. 12/449,290 filed 2 Sep. 2009, the content of which is incorporated herein by this reference.

FIELD OF THE INVENTION

The invention relates to a device and a method for the determination of distance by means of light pulses. The invention relates particularly to a LIDAR device and a LIDAR method.

BACKGROUND OF THE INVENTION

Aviation-assisted devices for the determination of distance by means of light pulses are used particularly for the measurement of data before the establishment of digital terrain models, where the distance to the site of the reflection is determined from the travel time of the light pulse from the device to the site of the reflection and again back to the device (i.e., the light echo).

Such devices and methods are known to the person skilled in the art by the term LIDAR (light detection and ranging).

Conventional LIDAR devices work with a so-called "single pulse in air" method. In such a method, there is always only one light or laser pulse on the path between the light source of the device, the site of the reflection, and the detector of the device. In the process, the problem that arises is that with increasing distance of the aviation-supported LIDAR device from the site of the reflection, the maximum light pulse frequency, i.e., the frequency at which the light pulses can be emitted by the LIDAR device, decreases necessarily, because the travel time of the light pulses increases with increasing distance. It is clear that it is advantageous to work at a high light pulse frequency, because it allows, in comparison to a lower light pulse frequency, a finer scanning (higher data point density), and thus a better resolution of the terrain to be measured.

The dependency of the maximum possible light pulse frequency $f_{max}$ on the flying altitude, without taking into consideration a system-related temporal offset in the order of magnitude of $10^{-6}$ sec, results from the following relation:

$$f_{max}=c/(2\times h),$$

where c is the speed of light, and h is the flying altitude. Using the above relation, one gets, for example, for a flying altitude h of 1500, 3000 and 4500 m, a maximum light pulse frequency of 100, 50 and 33 kHz (respectively 91, 48 and 32 kHz taking into account a system-related temporal offset).

The consequences of the above-described effect, namely that, in conventional LIDAR devices, the maximum possible light pulse frequency decreases with increasing flying altitude, if the LIDAR device is designed, for example, as a fiber optic scanner in which the terrain is scanned transversely to the flight direction, are reinforced by the fact that, at constant angle of beam and with increasing flying altitude, the separation between two adjacent measurement points in the object plane is increased, which effectively leads to a further decrease in the measuring point density.

In the German Patent DE 36 06 544 C1, a device for measuring distance by laser according to the preamble of claim 1 is described with a transmitter and a receiver, where the pulse travel time represents a measure of the distance. To provide an interference-insensitive start trigger signal generation that allows the determination of a precise trigger time point, one provides, in the immediate vicinity of the detector element provided for the remote signal, at least one additional detector element which reacts to radiation that is indeed transmitted by the transmitter, but does not reach the target reflection, being instead scattered in the housing.

U.S. Pat. No. 4,926,185 describes a pulse radar system in which two or more consecutive transmission pulses are transmitted cyclically with different carrier frequencies, allowing an unequivocal temporal assignment of the given reception pulse to the transmission pulse.

The present invention is thus based on the problem of providing an improved device or an improved method for the determination of distance by means of light pulses, which avoids particularly the above-mentioned disadvantages of known LIDAR devices and LIDAR methods.

SUMMARY OF THE INVENTION

This problem is solved by a device as well as a method for the determination of distance by means of light pulses according to Claim 1 or 12.

The device according to the invention for the determination of distance by means of light pulses comprises a light source for the emission of light pulses with a certain frequency, a detector for receiving the light pulses transmitted and reflected by the light source, as well as a control device which is connected to the light source and to the detector, and communicates with them, while being capable of controlling them by means of signals.

It is essential for the invention that the device for the determination of the distance by means of light pulses comprises furthermore at least two timers, and the control is designed in such a way that, upon emission of a light pulse by the light source, it generates a start signal. This start signal starts or triggers the time measurement by means of at least one of the two timers, in each case in order and beginning again from the start. In other words, the start signal first triggers the time measurement by the first timer, and then the second timer, and finally the last timer, to make it possible in this way to begin again with the first timer from the start. Furthermore, the detector is designed so that upon receiving a reflected light pulse it generates a stop signal, which is routed to at least two timers, and which stops the time measurements by the timer of the at least two timers to which a measurement window is assigned temporarily by the control.

The above design makes it possible for the at least two timers to measure in each case independently of each other, within a short temporal interval, the light travel time of light pulses, so that several light pulses can be present simultaneously in the air, i.e., on the path between the light source, the reflection site, and the detector.

It is preferred for the assignment by the control of the measurement windows to at least two timers to be done in the triggering order of the at least two timers, beginning again from the start, with no temporal overlap of the measurement windows.

Furthermore, it is preferred for the assignment of the measurement windows by the control to the at least two measurement timers to occur in such a way that the measurement window of a given timer of the at least two timers starts at the time when the measurement window of the previous timer ends, so that each detected light pulse falls in a measurement window.

According to a preferred embodiment, the time period between successively occurring triggerings of the time measurement by one of the at least two timers is a whole number multiple of the time period between triggerings of the time measurement by successive timers of the at least two timers.

Furthermore, it is preferred for the triggering of the time measurement by one of the at least two timers, and the assignment of a measurement window to this timer by the control, to occur in such a way that there is a buffer period between the end of the measurement window and the triggering of an additional time measurement by the timers.

The device for the determination of the distance by means of light pulses is preferably a fiber optic scanner. The fiber optic scanner comprises a transmission unit, where the light pulses that are transmitted by the light source with a certain frequency are guided via a rotating mirror that is tilted toward its rotation axis to the circularly arranged beginnings of glass fibers of a first glass fiber array, as well as a reception unit that is constructed symmetrically with respect to the former unit, where the incoming light pulses are guided to glass fibers of a second glass fiber array, whose ends are in a circular arrangement, and from there they are guided to the detector via a rotating mirror that is tilted toward its rotation axis. The transmission unit and the reception unit are driven jointly by an electromotor which can be controlled via the controller.

According to a preferred embodiment, the ends of the glass fibers of the first glass fiber array form a rectilinearly arranged transmission row in the focal plane of a first lens, and the beginnings of the glass fibers of the second glass fiber array form a rectilinearly arranged reception row in the focal plane of a second lens.

As light sources one can use, for example, light emitting diodes or glass fiber-coupled light emitting diodes. For example, modulated CW laser diodes or CW lasers can be used.

The glass fiber array is a cross-section converter by means of which a circular arrangement of the glass fibers can be transformed into a linear arrangement (focal plane transformation from a circle to a line). It consists, for example, of a number of quartz filaments which can have a core diameter of 0.2 mm. It is also possible to use other multimode or monomode fibers. The number of fibers can be chosen as desired. The maximum number of fibers is limited only by the array manufacturing procedure.

The rotating element is a mirror (preferably a planar mirror), which is (slightly) tilted with respect to its rotation axis. The mirror can be attached with small tilt on a holder which rotates parallel to the optical axis. It is also possible for the rotation axis of the mirror not to be located in the optical axis of the scanner. In this case, the light source is also not arranged in the optical axis. However, both designs share the fact that the mirror is tilted with respect to its rotation axis.

An electromotor is provided as drive for the rotating element. For example, a high speed motor (direct current or synchronous motor). The number of revolutions is, for example, 15,000 revolutions per minute. It can also be increased to values much greater than 100,000 revolutions per minute.

Additional embodiments are defined in the secondary claims.

DETAILED DESCRIPTION OF A PREFERRED EMBODIMENT

Figure 1:
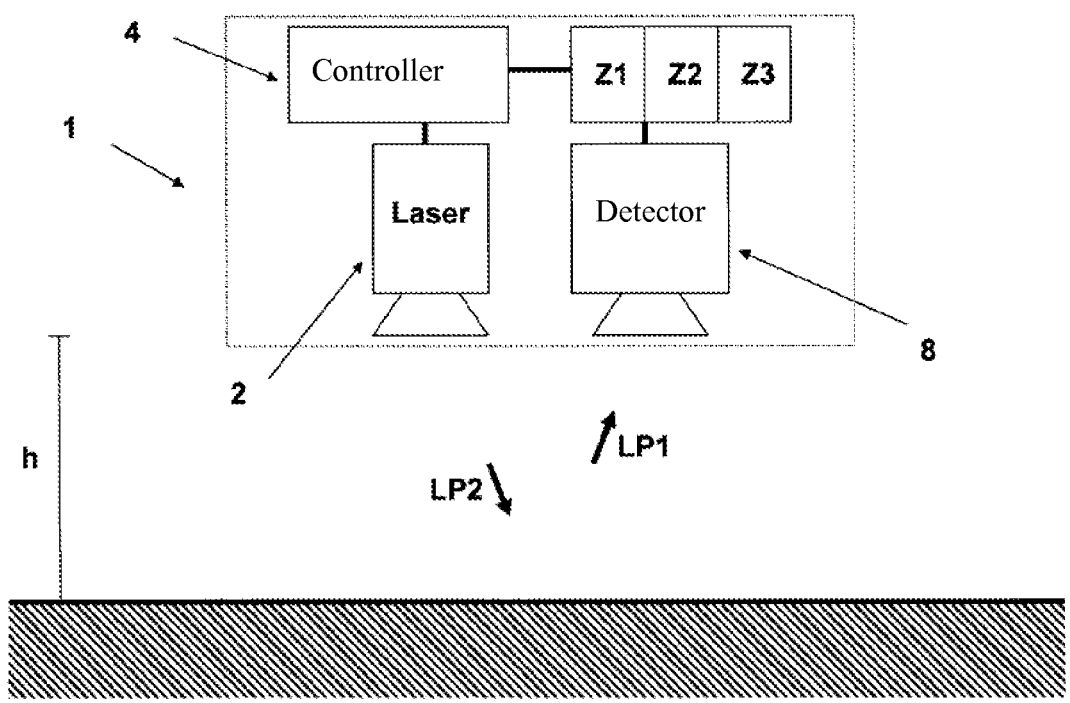
FIG. 1 shows a schematic representation of a device according to the invention for the measurement of distance by means of light pulses.

FIG. 1 is a schematic representation of a device 1 according to the invention for the determination of distance by means of light pulses. This device can be installed, for example, in an aircraft, in order to carry out, at a flying altitude of h, distance measurements, and thus acquire data on the terrain being flown over. The device 1 for the determination of distance by means of light pulses comprises a light source (for example, a laser) 2 for the emission of light pulses with a certain frequency. The light pulses emitted and reflected by the light source 2 (for example LP1 and LP2) are received by a detector 8. The detector 8 and the light source 2 are connected to a controller 4, which is in communication with them or can control them.

Figure 2:
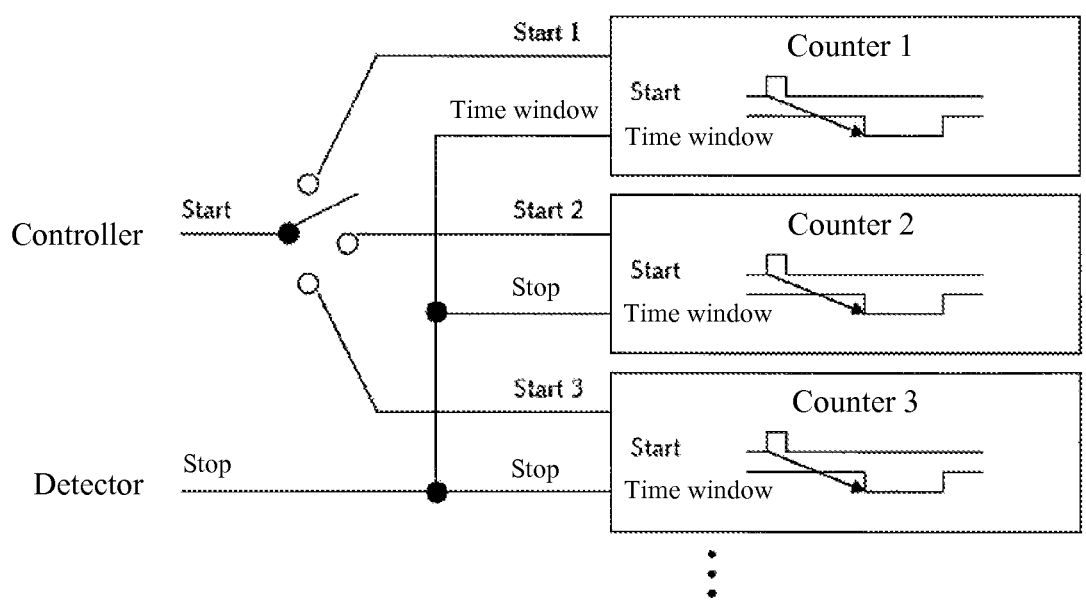
FIG. 2 is a schematic and simplified representation of the interaction of the components according to the invention of the device of FIG. 1.
Figure 3:
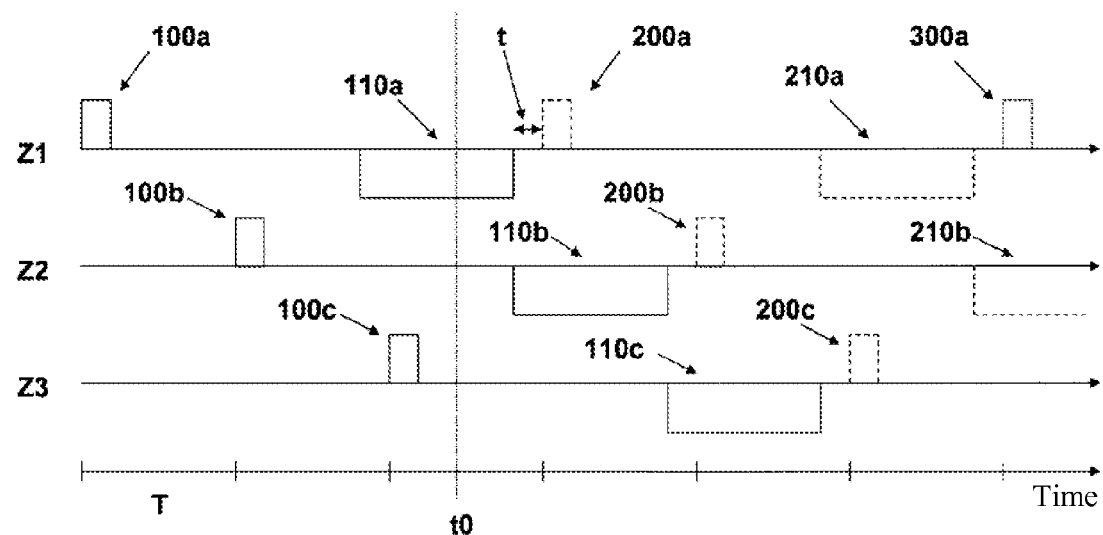
FIG. 3 shows a timing diagram, in which the assignment—made by the controller—of start signals and measurement windows to the timers is represented as an example.

As one can now also see in FIGS. 2 and 3, the device 1 according to the invention for the determination of distance by means of light pulses comprises furthermore several timers or counters (in FIGS. 1 to 3, three counters or timers Z1, Z2 and Z3 are represented, for example). The function of these timers Z1, Z2 and Z3 and their interaction with the controller 4 is described in detail below, in reference to FIGS. 2 and 3.

The scanning process is started by the emission of a first light or laser pulse LP1 by the light source or by the laser 2. At the same time, the controller 4 generates the start or trigger signal 100a, which triggers the time measurement by the first timer Z1. After a time period T, a second laser pulse LP2 is transmitted, and again a start or trigger signal 100b is generated simultaneously, by means of which the time measurement by the second timer Z2 is triggered. At this point in time, the first light pulse LP1 has already traveled a distance c*T on its path from the light source 2 to the reflection site and back to the detector 8, and is thus still in the air. After an additional time period T, a third laser pulse is transmitted (not shown in FIG. 1) and again a start or trigger signal 100c is generated simultaneously, by means of which the time measurement by the third timer Z3 is triggered. At this point in time, the second light pulse LP2 has traveled a distance c*T on its path from the light source 2 to the reflection site and back to the detector 8, and is thus also still in the air. Depending on the flying altitude h, it would be possible for the first light pulse LP1 to be still present in the air as well, or to have already been detected by the detector 8. In the case where a fourth timer or additional timers are present, after another time period T, a fourth laser pulse or additional laser pulses are transmitted, and a start signal is generated by means of which the time measurement by the fourth timer or additional timers is triggered. If no additional timer is present, the sequence begins again from the start, i.e., after an additional time period T, a fourth light pulse is transmitted, and a start or trigger signal 200a is generated again, by means of which the time measurement by the first timer Z1 is triggered, which has already received, as described below, a stop signal within a time window 110a, and is therefore again ready to measure the travel time of a laser pulse. In the further course of the scanning process, the additional start or trigger signals 200b, 200c and 300a trigger again the time measurement by the second timer Z2, the third timer Z3, and then again by the first timer Z1.

The expected travel time of a light pulse can be estimated by means of the flying altitude h, which is either entered before the start of the scanning process into the controller 4 as a parameter, or, if it changes during the course of the scanning process, sampled by the controller 4, preferably continuously. Using this estimate, the controller 4 assigns so-called measurement windows to the timers Z1, Z2 and Z3. As described in greater detail below, a timer that has been triggered according to the invention stops the time measurement only in the case where it receives a stop signal from the detector 8 at a point in time when a measurement window is assigned to this timer by the controller 4.

As one can see in FIG. 3, the controller 4 assigns a first measurement window 110a to the first timer Z1. The midpoint of this measurement window 110a can coincide, for example, with the end of the expected travel time of the first light pulse, which, as described above, can be estimated by means of the flying altitude h. The width of the measurement window 110a should be chosen in such a way that all the travel times of the first light pulse that are possible in practice can be covered by the measurement window 110a, and thus the first light pulse is also detected in the measurement window 110a. The person skilled in the art will realize that this can depend on several factors, including the expected altitude differences of the scanned areas as well as the angular extent of the scanned area. It is preferred for the temporal extents respectively the "widths" of the measurement windows 110a, 110b, 110c, 210a, 210b to be identical, and to correspond to the time period between triggerings of the time measurement by successive timers. In other words, all the measurement windows 110a, 110b, 110c, 210a, 210b present preferably a temporal extent T.

After the emission of the first light pulse LP1 by the light source 2, the latter pulse will return to the detector 8 after a time period which corresponds to the travel time to be determined. Upon receiving a light pulse, the detector 8 generates a preferably electrical signal, which is routed, as stop signal, to all the timers Z1, Z2 and Z3. This stop signal has the effect that the time measurement of the timer Z1, Z2 or Z3 to which a measurement window is assigned at this point in time by the controller 4 is stopped. If, for example, in FIG. 3, at time t0, a reflected light pulse is received by the detector 8, and routed by the latter to all the timers Z1, Z2 and Z3, then the time measurement of the timer Z1 is stopped, because, at this time, the measurement window 110a is assigned to the timer Z1 by the controller 4. At this time, the stop signal has no effect on the other timers Z2 and Z3.

As one can see in FIG. 3, the [sic] assignment of the measurement window 110a, 110b, 110c, 210a, 210b, . . . to the timers Z1, Z2 and Z3 is made preferably by the controller 4 in the order of the triggerings of the timers Z1, Z2 and Z3, where the time windows 110a, 110b, 110c, 210a, 210b, . . . must not present any temporal overlay because otherwise a detected light pulse could trigger two timers, and would thus yield two travel times. Furthermore, the assignment of the measurement windows 110a, 110b, 110c, 210a, 210b, . . . to the timers Z1, Z2 and Z3 by the controller 4 occurs preferably in such a way that successive time windows follow each other directly. In other words, the measurement window of the timers Z1, Z2 or Z3 starts at the time when the measurement window of the previous timer Z3, Z1 or Z2 ends. As a result, one ensures that each detected light pulse falls in a measurement window. One way to achieve this is to increase the time period between successive triggerings of the time measurement by a timer (Z1 or Z2 or Z3) by a whole number multiple of the time period between the triggerings of the time measurement by successive timers (Z1, Z2 or Z2, Z3 or Z3, Z1).

As one can also see in FIG. 3, the triggering of the time measurement by a timer Z1, Z2 or Z3, and the assignment of a measurement window 110a, 110b, 110c, 210a, 210b, . . . to this timer by the controller 4 occurs in such a way that there is a buffer period t between the end of the measurement window and the triggering of an additional time measurement by the timer. I.e., for example, in such a way that the end of the measurement window 110a which is assigned to the first time window Z1 is followed first by a buffer period t, before the next light pulse is triggered by the light source 2, and at the same time a start or trigger signal 200a is generated, by means of which the time measurement by the third timer Z1 is triggered again. The buffer period t ensures that no timer is triggered before its measurement window has elapsed. For the case where a timer does not receive a stop signal, while a measurement window is assigned to it by the controller 4, and the time measurement of the time window is thus not terminated, the time measurement of this timer is interrupted before the triggering of the next light pulse at the end of the measurement window or during the buffer period t.

Figure 4:
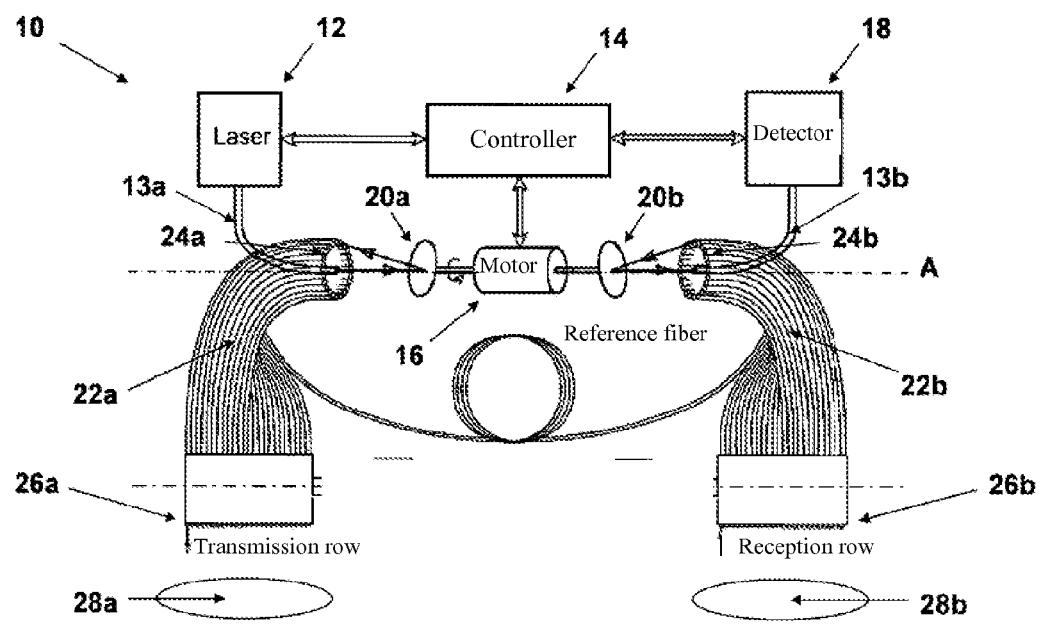
FIG. 4 shows a schematic representation of a preferred embodiment of the device of FIG. 1 as a fiber optic scanner.

It is particularly preferred for the device according to the invention for the detection of distance by means of light pulses to be designed as a fiber optic scanner. FIG. 4 shows such a fiber optic scanner 10 according to the invention, which is suitable for light emission and also light reception. Its structure is symmetric, and it possesses on the left side a transmitting part or a transmission unit, and on the right side a receiving part or a receiving unit. As light source it is preferred to use here a preferably pulsed laser 12. The light of the laser 12 is introduced in the beginning of the glass fiber 13a, whose end is arranged on the optical axis A of the fiber optical scanner 10. The light pulse which exits from the end of the glass fiber 13a hits a rotating mirror 20a. After reflection on the mirror 20a which is tilted toward the rotation axis A, the light pulse is coupled in a beginning of a glass fiber of a circular array 24a of glass fibers 22a. The circular shape can be achieved by means of appropriate holder elements. As a result of the rotation of the mirror 20a, which is mounted on the drive shaft of a motor 16 by means of a mirror holder, the light pulses exiting from the glass fiber 13a are injected successively into the individual glass fiber beginnings 24a of the glass fibers 22a. The glass fiber beginnings 24a are here arranged in the shape of a ring and concentrically with respect to the light injecting glass fibers 13a. The light beams that exit from the ends of the glass fibers 22a are collimated by a lens 28a. The ends of the glass fibers 22a are arranged in a row pattern in the focal plane of the lens 28a, and thus form a transmission row 26a. Here, the ends of the glass fibers 22a are oriented in such a way that the central axis of the light pulses passes through the center point of the lens 28a. This arrangement makes it possible to deflect with minimal transmission losses a collimated light beam of any diameter with respect to its direction at very high speed.

On the right side of FIG. 4, the system that has just been described is arranged again symmetrically to the second end of the drive shaft of the motor 16. The right side can be used as a reception unit, i.e., the reception row 26b and the transmission row 26a are adjusted with respect to their lenses 28b and 28a in such a way that they take a bearing on the same object points. The light path runs in the opposite direction with respect to the above-described light path in the transmission unit of the fiber optic scanner 10. A reflected light pulse passes through the lens 28b in a beginning of a glass fiber of the second array of glass fibers 22b in the reception line 26b, and, via the end of the glass fiber of the glass fiber ends 24b, hits a rotating mirror 20b, where it is reflected. Here, the glass fiber ends 24b of the array of glass fibers 22b are arranged in the shape of a ring and concentrically with respect to a beginning of the glass fiber 13b. The reflected light pulse is injected into this beginning of the glass fiber 13b that is located on the optical axis A, and, after passing through the glass fiber, it is detected by the detector 18. The first array of glass fibers 22a and the second array of glass fibers 22b can have a common reference fiber for calibration purposes.

Although the timers have been described as separate components of the controller in the above described preferred embodiment, the person skilled in the art will realize that the functions or tasks assigned according to the invention to the timers can also be carried out by individual components which may be separate from or part of the controller.

The invention claimed is:

1. Device for the determination of distance by means of light pulses, comprising:
   a light source for the emission of light pulses with a certain frequency;
   a detector for receiving the light pulses emitted and reflected by the light source; and
   a controller which is in communication with the light source and the detector, and which can control them by means of signals;
   at least two timers which are connected to the controller and the detector,
   where the controller is designed such that, when a light pulse is emitted by the light source, it generates a start signal which triggers the time measurement by only one of the at least two timers in order and beginning again from the start; and
   where the detector is designed so that, upon receiving a reflected light pulse, it generates a stop signal which is routed to the at least two timers, and which stops the time measurement by the timer of the at least two timers to which a measurement window is assigned temporarily by the controller.

2. Device according to claim 1, where the assignment of the measurement window by the controller to the at least two timers occurs in the triggering order of the at least two timers and beginning again from the start, without temporal overlap between the time windows.

3. Device according to claim 1, where the assignment of the measurement window by the controller to the at least two timers occurs in such a way that the measurement window of a given timer of the at least two timers starts at the point in time when the measurement window of the previous timer ends, so that each detected light pulse falls in a measurement window.

4. Device according to claim 1, where the time period between successive triggerings of the time measurement by one of the at least two timers is a whole number multiple of the time period between the triggerings of the time measurement by successive timers of the at least two timers.

5. Device according to claim 1, where the triggering of the time measurement by a timer of the at least two timers, and the assignment of a measurement window to this timer by the controller, occur such that there is a buffer period between the end of the measurement window and the triggering of a second time measurement by the timer.

6. Device according to claim 1, comprising:
   a transmission unit, where the light pulses of the light source are guided via a rotating mirror, which is tilted toward its rotation axis, on the circularly arranged beginnings of glass fibers of a first glass fiber array,
   a reception unit whose construction is symmetric with respect to the transmission unit, where the incoming light pulses are guided to glass fibers of a second glass fiber array whose ends are arranged circularly, and guided from there via a rotating mirror, which is tilted toward its rotation axis, to the detector, and
   an electromotor as common drive of the transmission and the reception unit, where the light source, the detector, and the electromotor are in communication with the controller, and can be controlled by the latter by means of signals.

7. Device according to claim 6, where the ends of the glass fibers of the first glass fiber array form a rectilinearly arranged transmission row in the focal plane of a first lens, and the beginnings of the glass fibers of the second glass fiber array form a rectilinearly arranged reception row in the focal plane of a second lens.

8. Device according to claim 6, where the light source is a light emitting diode, a glass fiber-coupled light emitting diode, a modulated CW laser diode or a CW laser.

9. Device according to claim 6, where the first and the second glass fiber arrays are each made of 128 or 300 glass fibers.

10. Device according to claim 6, where the electromotor is one of a direct-current motor and a synchronous motor.

11. Device according to claim 6, where the first glass fiber array and the second glass fiber array have a common reference fiber for calibration purposes.

12. Method for the determination of distance by means of light pulses, comprising the following steps:
   generating a start signal upon emission of a light pulse by a light source, which triggers the time measurement by only one of at least two timers in each case in order and beginning again from the start, and
   generating a stop signal upon reception of a reflected light pulse, which stops the time measurement by the timer of the at least two timers to which a measurement window is assigned temporarily.

* * * * *